(12) United States Patent
Navas Cornejo et al.

(10) Patent No.: US 10,484,245 B2
(45) Date of Patent: Nov. 19, 2019

(54) SELECTIVE INACTIVATION OF CONTROL RULES PARAMETERS

(71) Applicant: Telefonaktiebolaget LM Ericsson (publ), Stockholm (SE)

(72) Inventors: Angel Navas Cornejo, Leganes (ES); Susana Fernandez Alonso, Madrid (ES); Marta Montejo Ayala, Getafe (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 15/562,521

(22) PCT Filed: Mar. 31, 2015

(86) PCT No.: PCT/EP2015/000685
§ 371 (c)(1),
(2) Date: Sep. 28, 2017

(87) PCT Pub. No.: WO2016/155753
PCT Pub. Date: Oct. 6, 2016

(65) Prior Publication Data
US 2018/0097700 A1      Apr. 5, 2018

(51) Int. Cl.
*G06F 15/177*       (2006.01)
*H04L 12/24*        (2006.01)
(Continued)

(52) U.S. Cl.
CPC ...... *H04L 41/0893* (2013.01); *H04L 12/1407* (2013.01); *H04L 41/5022* (2013.01);
(Continued)

(58) Field of Classification Search
CPC ............................ H04L 12/1407; H04M 15/66
See application file for complete search history.

(56) References Cited

U.S. PATENT DOCUMENTS 9,258,433 B1 *    2/2016   Subramanian .... H04M 15/8228
9,380,446 B2 *    6/2016   Zhou ....................... H04W 8/02
(Continued)

OTHER PUBLICATIONS

ETSI TS 129 212 v12.8.0; Technical Specification; Universal Mobile Telecommunications System (UMTS); LTE; Policy and Charging Control (PCC); Reference points (3GPP TS 29.212 version 12.8.0 Release 12)—Apr. 2015.
(Continued)

*Primary Examiner* — Hieu T Hoang
(74) *Attorney, Agent, or Firm* — Baker Botts, LLP

(57) ABSTRACT

The present invention faces the issues of inactivating a particular control rule parameter, only for a given control rule and whilst maintaining this particular control rule parameter for other control rules and provides for methods and apparatuses whereby, upon determining by a control server that a particular parameter is no longer applicable for a first control rule, a modified control rule is determined that includes a removal indicator indicating the particular parameter to be removed for the first control rule previously installed and not for other control rules. The modified control rule is submitted to an enforcing device which removes the particular parameter only for the first control rule previously installed and not for others.

26 Claims, 9 Drawing Sheets

(51) Int. Cl.
*H04L 12/14* (2006.01)
*H04M 15/00* (2006.01)
*H04W 4/24* (2018.01)
*H04W 4/70* (2018.01)

(52) U.S. Cl.
CPC ............ *H04M 15/66* (2013.01); *H04W 4/24* (2013.01); *H04L 12/1435* (2013.01); *H04W 4/70* (2018.02)

(56) References Cited

U.S. PATENT DOCUMENTS

| | | | | |
|---|---|---|---|---|
| 2011/0035782 | A1* | 2/2011 | Xia | H04L 12/14 726/1 |
| 2012/0005356 | A1* | 1/2012 | Hellgren | H04L 63/20 709/229 |
| 2012/0233325 | A1* | 9/2012 | Zhou | H04L 12/1407 709/224 |
| 2012/0246325 | A1* | 9/2012 | Pancorbo Marcos | H04L 63/102 709/227 |
| 2012/0290713 | A1* | 11/2012 | Ellis | H04L 12/1407 709/224 |
| 2014/0059201 | A1* | 2/2014 | Mo | H04L 12/1485 709/224 |
| 2014/0086052 | A1 | 3/2014 | Cai | |
| 2014/0233432 | A1* | 8/2014 | Lim | H04L 63/20 370/259 |
| 2014/0334303 | A1 | 11/2014 | Ma | |
| 2015/0120727 | A1* | 4/2015 | Shinde | G06F 16/38 707/736 |
| 2015/0180945 | A1* | 6/2015 | Hall | H04W 88/08 709/203 |
| 2015/0341851 | A1* | 11/2015 | Cai | H04W 4/08 455/434 |
| 2016/0127565 | A1* | 5/2016 | Sharma | H04M 15/67 455/406 |

OTHER PUBLICATIONS

3GPP TS 23.203 v13.0.1; Technical Specification; 3rd Generation Partnership Project; Technical Specification Group Services and System Aspects; Policy and charging control architecture (Release 13)—Jun. 2014.

3GPP TS 29.212 v13.0.0; Technical Specification; 3rd Generation Partnership Project; Technical Specification Group Core Network and Terminals; Policy and Charging Control (PCC); Reference points (Release 13)—Dec. 2014.

PCT International Search Report for International application No. PCT/EP2015/000685—dated Nov. 30, 2015.

* cited by examiner

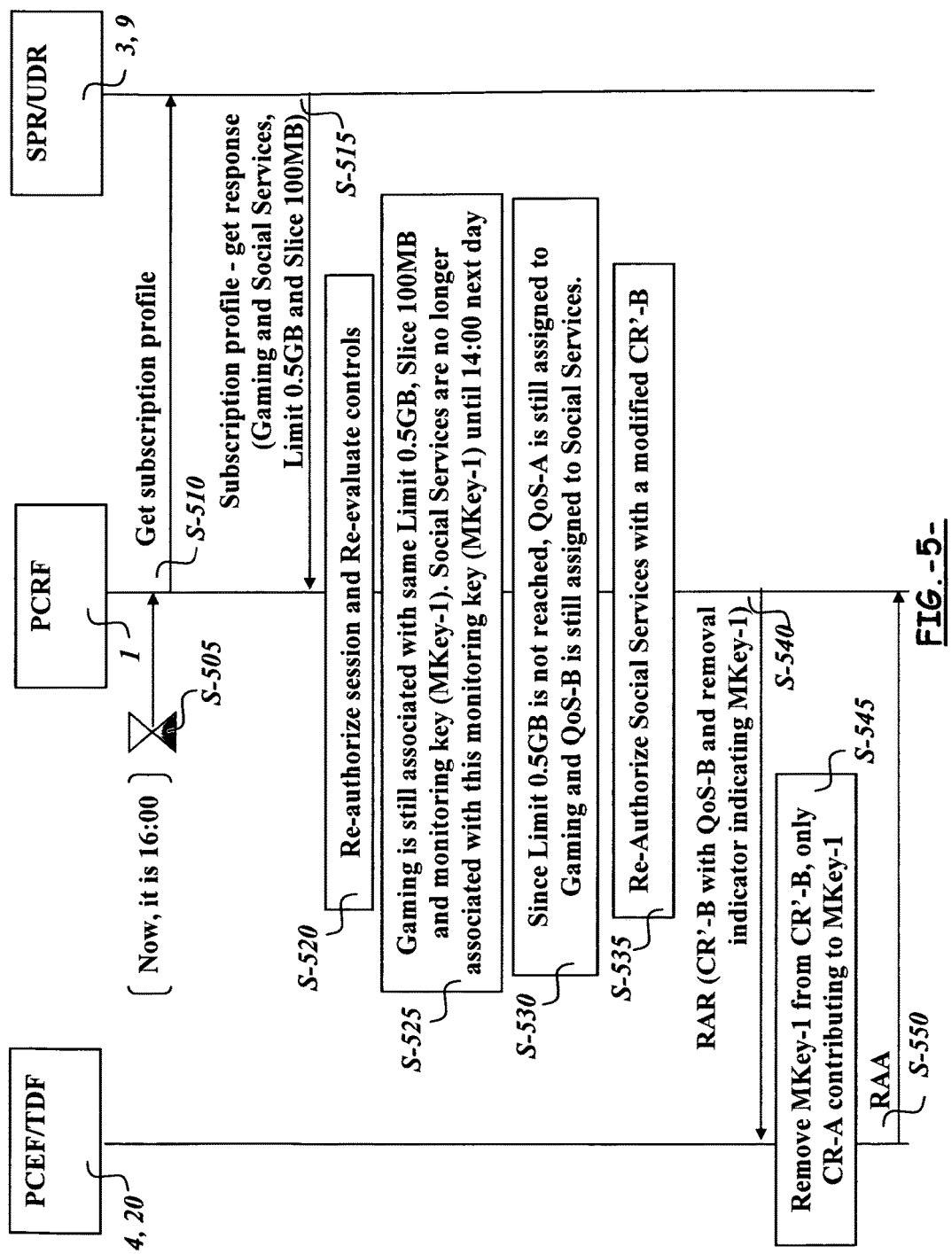
FIG. -5-

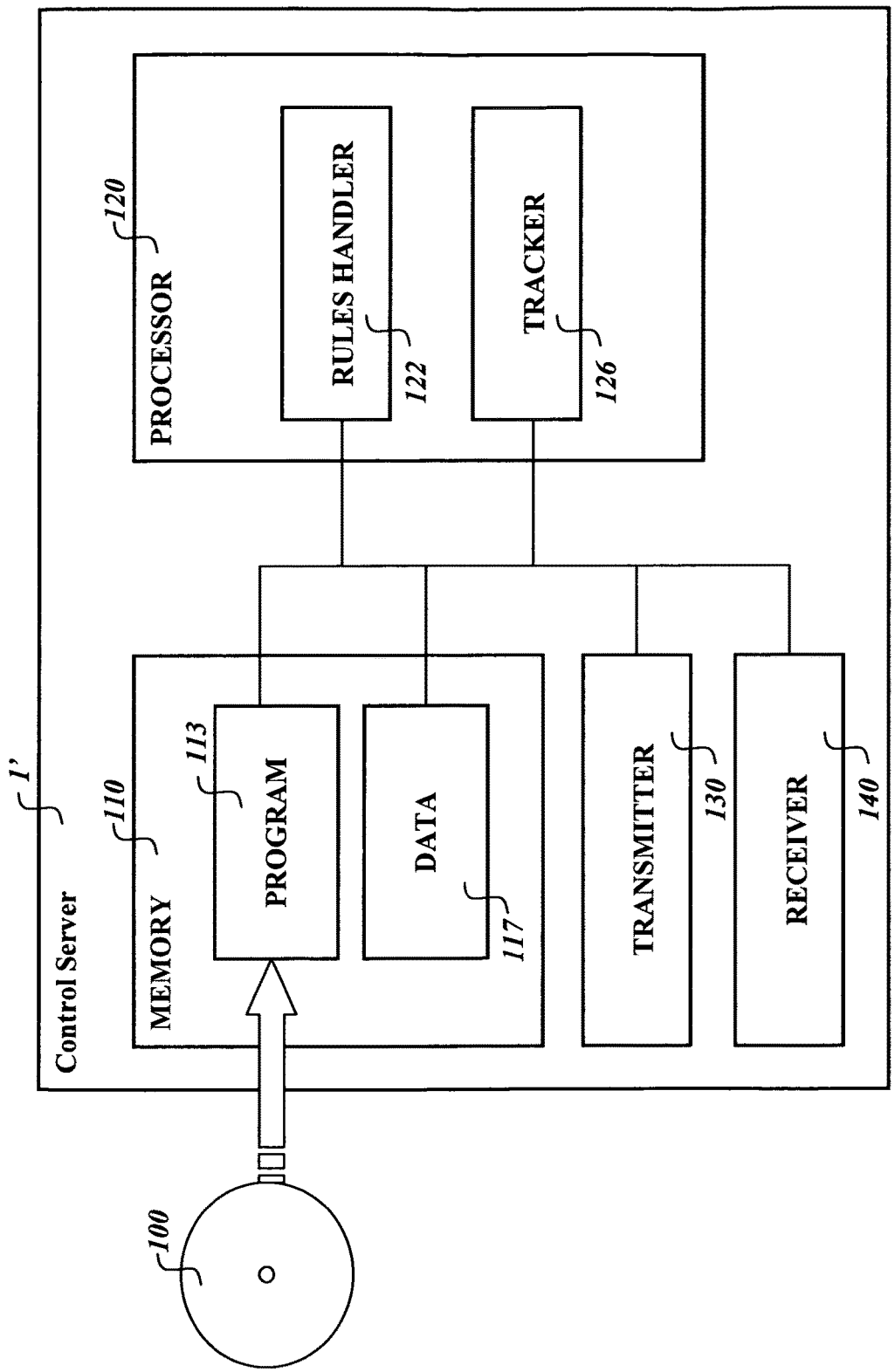

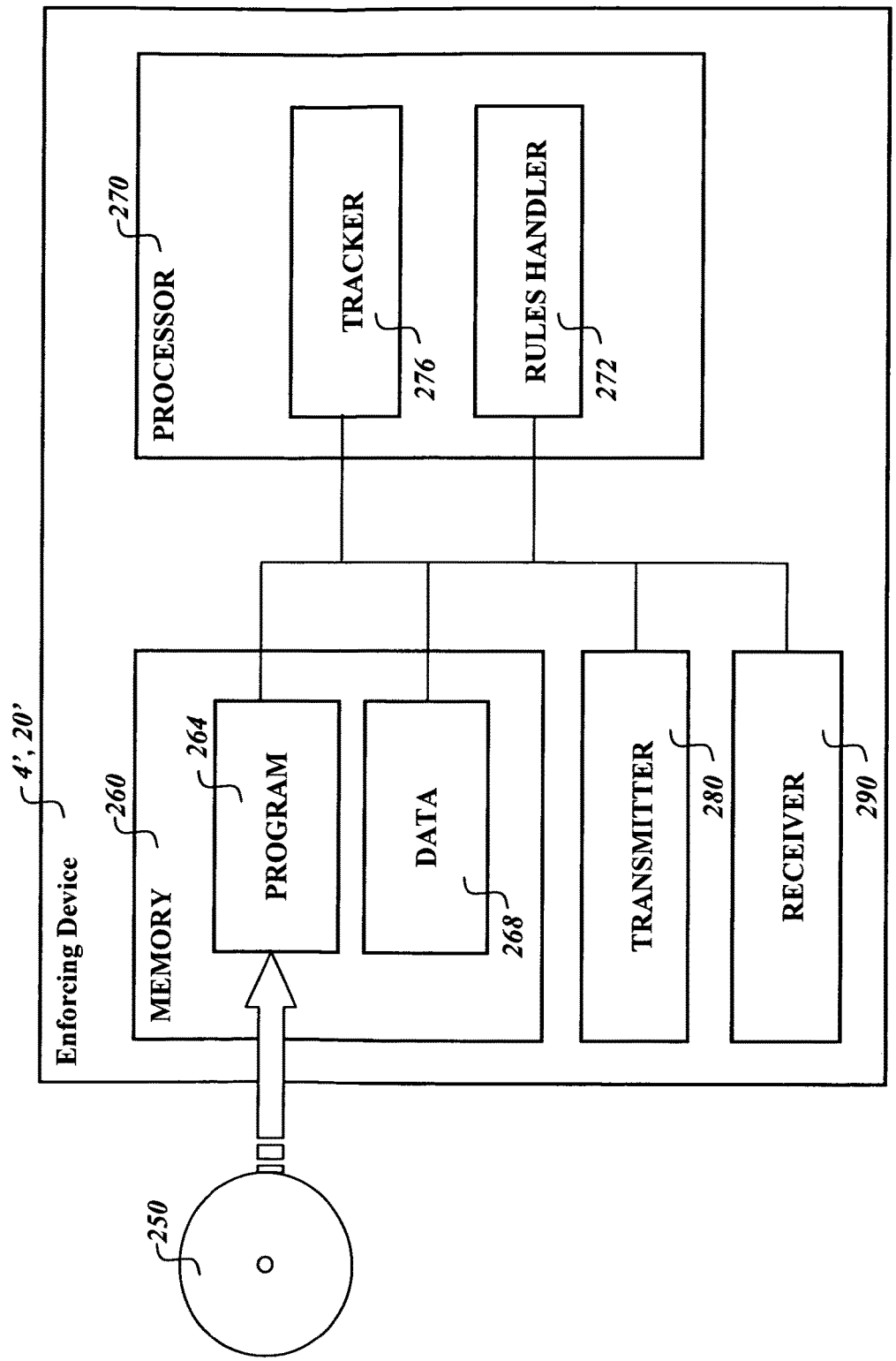
FIG. -7-

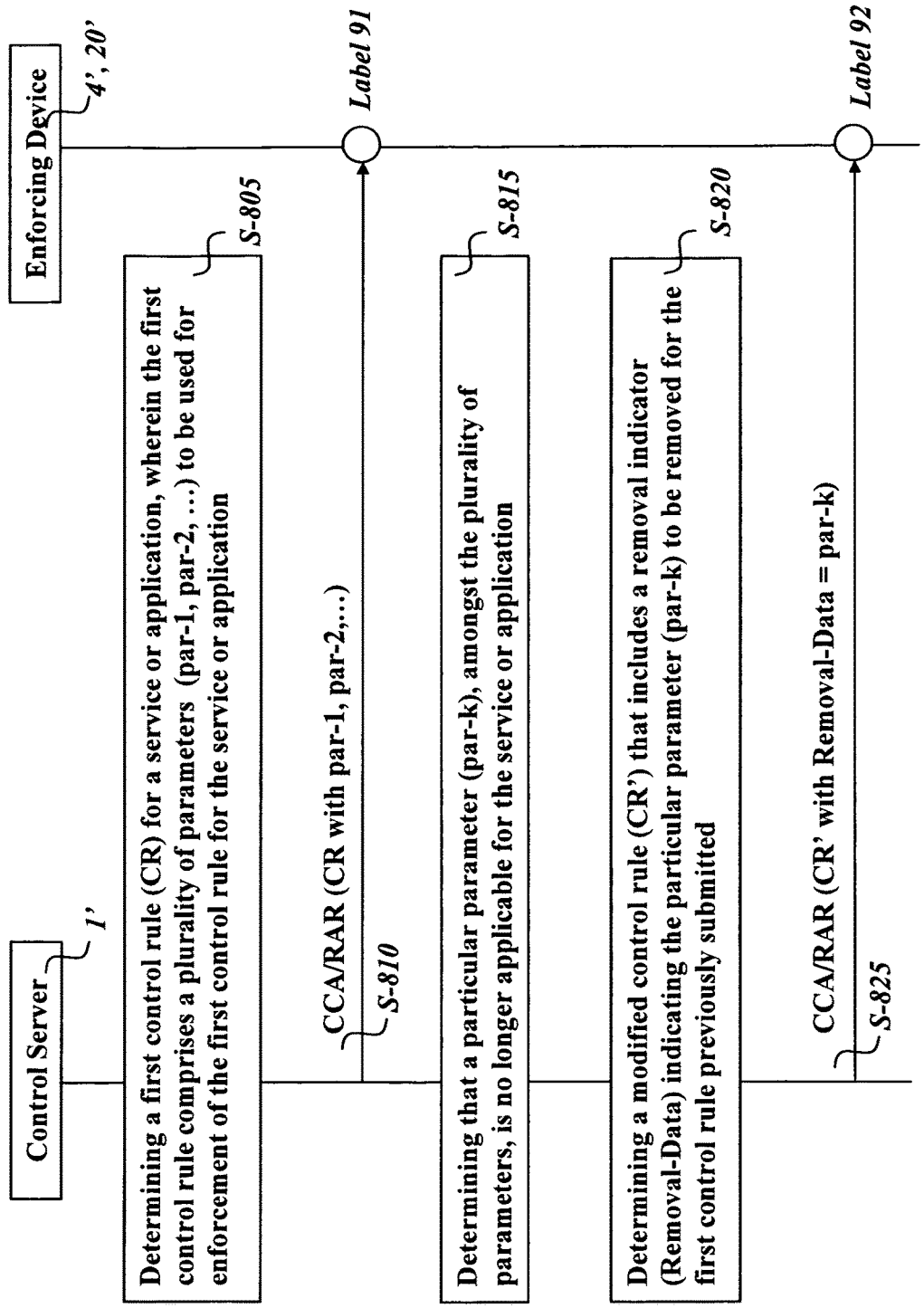
FIG. -8-

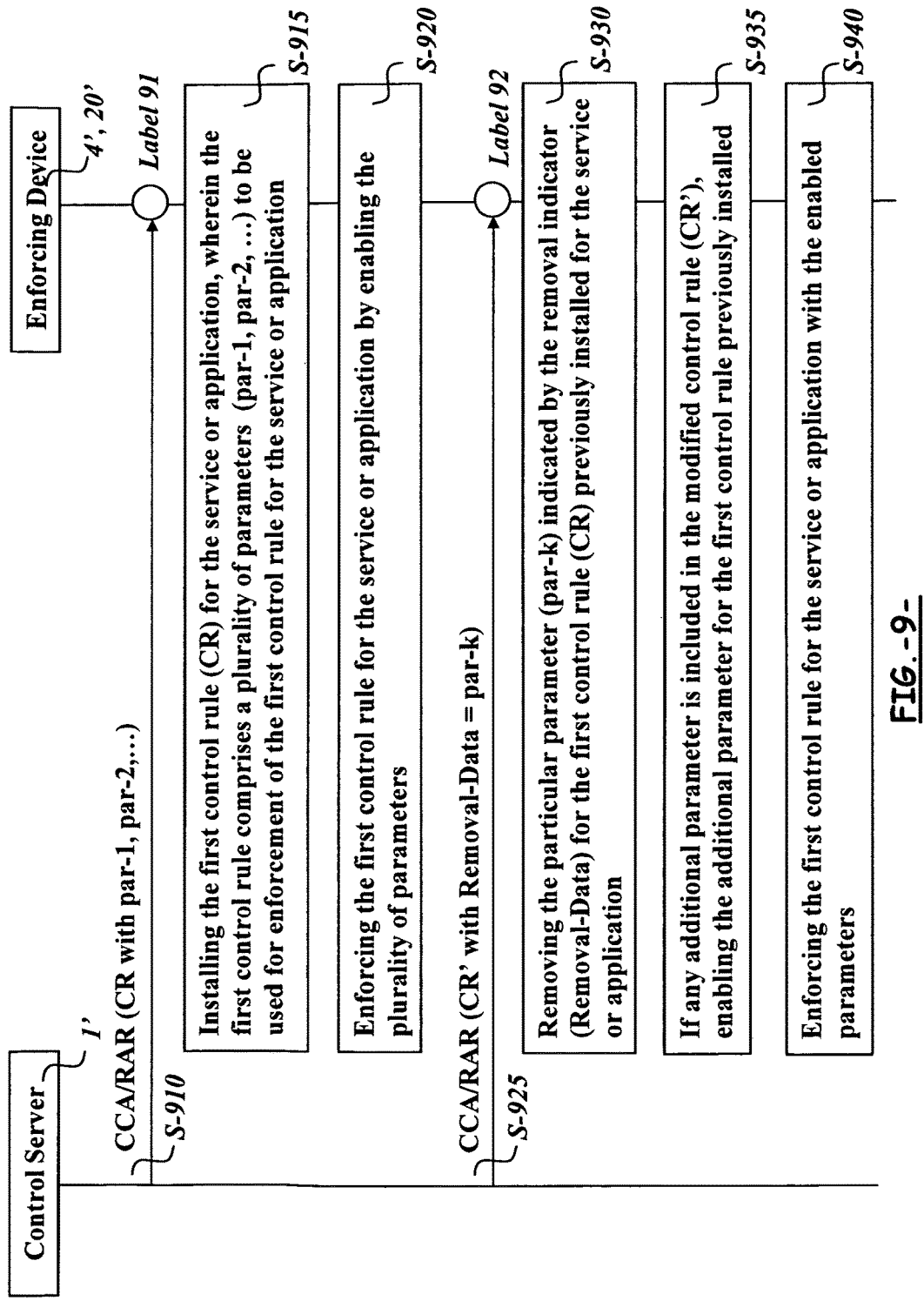
FIG. -9-

SELECTIVE INACTIVATION OF CONTROL RULES PARAMETERS

PRIORITY

This nonprovisional application is a U.S. National Stage Filing under 35 U.S.C. § 371 of International Patent Application Serial No. PCT/EP2015/000685 filed Mar. 31, 2015, and entitled "Selective Inactivation Of Control Rules Parameters."

TECHNICAL FIELD

The present invention generally relates to handling of control rules in a Policy and Charging Control architecture; and, more specifically, the invention relates to selectively inactivating one or more parameters of a control rule.

BACKGROUND

The architecture supporting Policy and Charging Control (PCC) functionality is illustrated in FIG. 1 and disclosed in 3GPP TS 23.203 V13.0.1 that specifies the PCC functionality for Evolved 3GPP Packet Switched domain, including both 3GPP accesses (GERAN/UTRAN/E-UTRAN) and Non-3GPP accesses. For the purpose of the present invention, the PCC architecture includes a Policy and Charging Rules Function (PCRF), a Policy and Charging Enforcement Function (PCEF), a Traffic Detection Function (TDF) and, optionally, a Bearer Binding and Event Reporting Function (BBERF) and a Subscription Profile Repository (SPR).

The PCRF is a functional element that encompasses policy control decision and flow based charging control functionalities. The PCRF provides network control regarding the service data flow detection, gating, Quality of Service (QoS) and flow based charging (except credit management) towards the PCEF. The PCRF may receive session and media related information from an application function (AF) and may notify the AF of traffic plane events.

The PCRF provides PCC rules to the PCEF via a Gx reference point. The PCRF informs the PCEF, by means of the PCC rules, on the treatment of each service data flow that is under PCC control, in accordance with PCRF policy decisions.

The PCEF encompasses service data flow detection based on filters definitions included in the PCC rules, as well as online and offline charging interactions (not described here) and policy enforcement. Since the PCEF is the system element handling the bearers, this is where the QoS is being enforced for the bearer according to the QoS information received from the PCRF. The PCEF functional entity is located at a Gateway, such as e.g. a Gateway GPRS Support Node (GGSN) in the GPRS case, a Packet Data Network Gateway (PGW) in the EPS case, and a Packet Data Gateway (PDG) in the WLAN case.

The SPR is in charge of providing subscription data for a user to the PCRF via a Sp reference point. However, a User Data Repository (UDR), as disclosed in 3GPP TS 23.335 v12.0.0, may replace the SPR for provision of subscription data to the PCRF via a Ud reference point.

This PCC architecture may also include a Bearer Binding and Event Reporting Function (BBERF) which, for the purpose of the present invention, behaves in a similar manner and for a similar purpose as the PCEF, but for receiving and handling QoS rules, instead of PCC rules, via a Gxx reference point.

The TDF is a functional entity that performs application detection and reporting of detected application, and its service data flow description, to the PCRF via a Sd reference point. The TDF can act in solicited mode, i.e. upon request from the PCRF, or unsolicited mode, i.e. without any request from the PCRF. In order to perform the application detection, the TDF receives Application Detection and Control (ADC) rules from the PCRF via the Sd reference point, in a similar manner and for a similar purpose as the PCEF receives the PCC rules.

3GPP TS 29.212 V13.0.0 specifies the operations on PCC rules, ADC rules and QoS rules, as well as the particular parameters that a PCC rule, an ADC rule and a QoS rule may comprise. The PCC rules, ADC rules and QoS rules may be dynamic rules provisioned by the PCRF, or static rules respectively predefined at the PCEF, TDF and BBERF. The operations available for dynamic rules are: installation, modification and removal; whereas the operations available for static rules are: activation and deactivation.

A PCC rule and a QoS rule include a service data flow filter used to identify a service data flow, and one or more service data flow filters are used to select the traffic for which the PCC rule and the QoS rule applies. An ADC rule includes a TDF application identifier used to reference the corresponding application, for which the ADC rule applies. The same application identifier value can occur in more than one ADC rule and, if so, the PCRF ensures that there is at most one ADC rule active per application identifier value at any time.

The PCEF may include the TDF functionality. Where this is the case, a PCC rule may be complemented to include a corresponding ADC rule. In particular, the PCEF including the TDF receives PCC rules that include service data flow filters and application identifier.

For the sake of simplicity, and given the similar behaviour for the purpose of the present specification, the PCEF, BBERF and/or TDF are hereinafter indistinctly referred to as 'PCEF/TDF' unless otherwise specified. Likewise, PCC rules for the PCEF, QoS rules for the BBERF and ADC rules for the TDF are hereinafter indistinctly referred to as 'control rules' unless otherwise specified, whereas service data flow filter for a PCC rule or a QoS rule, and application identifier for an ADC rule, may respectively be referred to as 'service' and 'application' and are hereinafter indistinctly referred to as 'service' unless otherwise specified. Likewise, parameters of a PCC rule, an ADC rule and a QoS rule are hereinafter referred to as control rule parameters, unless otherwise specified.

A control rule with a number of control rule parameters can be installed, modified or removed by the PCRF. When a new control rule is installed by the PCRF, all the control rule parameters in the new control rule are enabled by the PCEF/TDF to enforce the new control rule. When an existing control, rule is removed by the PCRF, all the control rule parameters in the existing control rule are disabled or removed by the PCEF/TDF. When an existing control rule is to be modified by the PCRF, a modified control rule with one or more control rule parameters is submitted from the PCRF; the PCEF updates the existing control rule with the one or more control rule parameters in the modified control rule. To this end, the one or more control rule parameters in the modified control rule are enabled and overwrite the corresponding control rule parameters previously enabled in the existing control rule, and other control rule parameters previously enabled in the existing control rule and not included in the modified control rule remain enabled in the existing control rule.

At present, the inactivation or removal of a particular control rule parameter, or rather its parameter value, for a given control rule is possible by removing the given control rule and installing it again without the particular control rule parameter.

This limitation is even more severe where a particular control rule parameter is shared by more than one control rule and there is a need to remove the particular control rule parameter for a given control rule whilst maintaining this particular control rule parameter for other control rules. The only possibility nowadays is the removal of the given control rule followed by the installation again of the given control rule without the particular control rule parameter.

In this respect, similar limitations exist for the PCC rules over the Gx reference point, the ADC rules over the Sd reference point and the QoS rule over the Gxx reference point. For example, the parameters Sharing-Key-UL and Sharing-Key-DL are used to indicate which rules should share resources (GBR is calculated as the maximum GBR among them); and it is only possible to remove previously provided values by applying a fake value (a value that cannot be shared with other rules). Also for example, it is not possible nowadays to stop applying a maximum bandwidth to a PCC/QoS rule; it is only possible to provide a very high value that is never reached. A value of the bandwidth set to zero can be interpreted as gating.

That is, at present, the inactivation or removal of a particular control rule parameter associated with a given control rule, whilst maintaining this same particular control rule parameter for other control rules, is only possible by removing the given control rule and installing again the given control rule without including the particular control rule parameter.

However, removal of e.g. PCC rules in the PCEF may have signalling impacts in the network. If the PCC rule was bound to a dedicated bearer, the PCEF has to initiate the update/termination of the corresponding bearer. This procedure is time and resource consuming. Besides, the PCRF would have to install the new PCC Rule without such particular control rule parameter, and this would also require the establishment/update of the related dedicated bearer.

SUMMARY

The present invention is aimed to at least minimize the above drawbacks and provides for a method for modifying a control rule for a service or application in a PCC architecture, a method for enforcement of a modified control rule for a service or application in a PCC architecture, a control server and an enforcing device, wherein the methods are respectively executed by the control server, which may be a PCRF server, and by the enforcing device, which may be any one of a TDF device, a BBERF device, a PCEF device, and combinations thereof.

Throughout this specification, a PCRF server is a network element arranged for carrying out the functionality of a PCRF in accordance with conventional PCC standards; a PCEF device is a network element arranged for carrying out the functionality of a PCEF in accordance with conventional PCC standards; a TDF device is a network element arranged for carrying out the functionality of a TDF in accordance with conventional PCC standards; a BBERF device is a network element arranged for carrying out the functionality of a BBERF in accordance with conventional PCC standards; and an SPR/UDR is a network element arranged for carrying out the functionality of an SPR/UDR in accordance with conventional PCC standards. In addition, the PCRF server, the PCEF device, the BBERF device, the TDF device and, the SPR/UDR throughout this specification are enhanced to accomplish the objects of the present invention.

In accordance with a first aspect of the present invention, there is provided a method for modifying a control rule for a service or application in a PCC architecture, the method executed by a control server.

This method comprises a step of determining a first control rule for a service or application, both hereinafter indistinctly referred to as the service, wherein the first control rule comprises a plurality of parameters to be used for enforcement of the first control rule for the service, and a step of submitting the first control rule to an enforcing device.

Generally speaking, the plurality of parameters of a control rule may indicate any one of policy control, charging information, sponsoring information, quality of service and combinations thereof.

Also in this method, upon determining that a particular parameter, amongst the plurality of parameters, is no longer applicable for the first control rule, there is a step of determining a modified control rule that includes a removal indicator indicating the particular parameter to be removed for the first control rule previously submitted, and there is a step of submitting the modified control rule to the enforcing device.

This method is advantageous when the particular parameter is shared by more than one control rule. In an embodiment, and prior to determining that the particular parameter is no longer applicable for the first control rule, the method may comprise determining a further control rule for a further service or application, both hereinafter indistinctly referred to as the further service, wherein the further control rule comprises the particular parameter amongst a plurality of further parameters to be used for enforcement of the further control rule for the further service, and the method may comprise submitting the further control rule to the enforcing device.

As commented above in respect of the first control rule, also the plurality of further parameters of a further control rule may indicate any one of further policy control, charging information, sponsoring information, quality of service and combinations thereof.

That is, in this embodiment, both first control rule and further control rule share the particular parameter and, upon determining that the particular parameter is no longer applicable for the first control rule, the method may comprise determining that the particular parameter is still applicable for the further control rule so that a modified further control rule with the removal indicator is not required.

A further advantageous embodiment is provided when the particular parameter shared by more than one control rule is a monitoring key included in the more than one control rule. In this respect, usage monitoring control is specified in 3GPP TS 23.203 V13.0.1 and TS 29.212 V13.0.0 and allows the PCRF to apply specific policies based on the usage of certain or all services related to a packet data network (PDN) connection. To this end, the PCRF requests the PCEF and the TDF to monitor the traffic volume/time related to a certain monitoring key, by providing the monitoring key and a volume/time usage allowed for that monitoring key.

In accordance with 3GPP TS 29.212 V13.0.0, the PCRF may handle multiple usage monitoring control instances. To this end, a monitoring key identifies a monitoring control instance that shall be used for usage monitoring control of service data flows.

Particularly applicable for PCC rules, the usage monitoring control makes use of data collected per monitoring key, which may apply for a single service data flow (SDF), a set of SDFs or for all the traffic in an IP Connectivity Access Network (IP-CAN) session established by a user. In this context, a monitoring key for a PCC rule identifies one, more or all SDFs to be controlled by said PCC rule. Moreover, a same monitoring key can thus apply to one or more PCC rules.

Particularly applicable for ADC rules, a monitoring key may also be included in an ADC rule which includes a TDF application identifier. The monitoring key for an ADC rule identifies a monitoring control instance to be used for usage monitoring control of a particular application, group of applications or all detected traffic belonging to a specific TDF session.

In operation, at IP-CAN session establishment, the PCRF may obtain information about total usage allowed for a service and one or more monitoring keys associated with the service to control the total service usage. Moreover, at IP-CAN session establishment and modification, the PCRF may provide applicable volume/time thresholds for usage monitoring control to the PCEF/TDF, along with the respective monitoring keys. That is, the total service usage is controlled by monitoring the volume/time thresholds for the monitoring keys.

The PCRF can modify the conditions applying for usage monitoring based on internal policies, e.g. change of subscription category, and to this end the PCRF can provide a new volume/time threshold related to any monitoring key. New or modified control rules can be installed in the PCEF/TDF in order to include an existing or new monitoring key.

At present, when usage monitoring is to be set for a new service for which no control rule is installed, the PCRF provides a new control rule with all parameters and including a monitoring key. Besides, when usage monitoring is to be set for a service for which a current control rule is already installed without a monitoring key, the PCRF provides a modified control rule with a new or an existing monitoring key. In this case, only values to be replaced are included in the modified control rule, and the PCEF/TDF will maintain values in current control rule when not included in the modified control rule.

Upon reception of one or more control rules with a same monitoring key, the PCEF/TDF starts monitoring the traffic related to the received monitoring key for the one or more services corresponding to the one or more control rules. The PCEF/TDF uses the filter information included in the control rule to identify the services for which it should apply monitoring. When the sum of the traffic related to all services associated to the monitoring key reaches the volume/time threshold provided by the PCRF, the PCEF/TDF informs the PCRF.

As anticipated above, an advantageous embodiment of this method is discussed in the following and may be applied when a same monitoring key is shared by several control rules.

In this embodiment, the method may comprise identifying a common monitoring key associated with the service and with the further service, determining a usage threshold, hereinafter referred to as monitoring quota, associated with the common monitoring, key, wherein the first control rule and the further control rule include the common monitoring key, and wherein submitting the first control rule and the further control rule to the enforcing device includes submitting the monitoring quota associated with the common monitoring key.

The modification of conditions related to usage monitoring might also require the inactivation, or removal, of a monitoring key related to a service or group of services. For example, when monitoring traffic related to a group of 'premium' services associated with a monitoring key, and the operator decides that a given service, amongst these 'premium' services, is not a 'premium' service any longer, the monitoring key associated with the given service should be inactivated, or removed, whilst maintained for the remaining 'premium' services.

In accordance with 3GPP TS 29.212 V13.0.0, the PCRF can disable usage monitoring related to certain monitoring key at any time during the lifetime of the IP-CAN session. To this end, the PCRF provides a Usage-Monitoring-Information AVP to the PCEF/TDF indicating the affected monitoring key and an indication to disable monitoring. Upon receipt of this AVP, the PCEF/TDF immediately stops monitoring for all services, i.e. control rules, associated with the affected monitoring key.

However, when a same monitoring key is associated with several control rules for corresponding several services, the existing Usage-Monitoring-Information AVP cannot be used to disable, or remove, the monitoring key for just one service whilst maintaining the same monitoring key for the other services.

This situation is solved with an advantageous embodiment of this method that may be applied when a same monitoring key is shared by several control rules and should be removed for one of them but not for the others.

In this advantageous embodiment, the particular parameter no longer applicable for the first control rule may be the common monitoring key included in the first control rule and the further control rule. When this is the case, the removal indicator included in the modified control rule indicates the common monitoring key, which is to be removed only for the first control rule and not for the further control rule previously submitted.

In other embodiments, the particular parameter no longer applicable for the first control rule may be a policy-related, charging-related, QoS-related or sponsor-related parameter included, at least, in the first control rule, instead of the monitoring key. When this is the case, the removal indicator included in the modified control rule indicates the corresponding policy-related, charging-related, QoS-related or sponsor-related parameter, which is to be removed only for the first control rule previously submitted.

In an embodiment of this method, the control server may be a PCRF server.

In an embodiment of this method, the control rules may be ADC rules and the enforcing device may be a TDF device. In another, the control rules may be PCC rules and the enforcing device may be a PCEF device. In still another, the control rules may be QoS rules and the enforcing device may be a BBERF device.

Nothing throughout this specification prevents from the control server submitting control rules to different enforcing devices, that is, PCC rules to the PCEF device, ADC rules to the TDF device and/or QoS rules to the BBERF device.

In accordance with a second aspect of the present invention, there is provided a method for enforcement of a modified control rule for a service or application in a PCC architecture, the method executed by an enforcing device.

This method comprises a step of receiving a first control rule for a service or application, both hereinafter indistinctly referred to as the service, from a control server, wherein the first control rule comprises a plurality of parameters to be used for enforcement of the first control rule for the service, a step of installing the first control rule, and a step of enforcing the first control rule for the service by enabling the plurality of parameters.

As commented above, the plurality of parameters of the first control rule may indicate any one of policy control, charging information, sponsoring information, quality of service and combinations thereof.

In this method there is a step of receiving a modified control rule for the service from the control server, wherein the modified control rule includes a removal indicator indicating a particular parameter to be removed for the first control rule previously installed, and there is a step of removing the particular parameter indicated by the removal indicator for the first control rule previously installed.

If any additional parameter is included in the modified control rule, there is a step of enabling the additional parameter for the first control rule previously installed and, with or without additional parameters, the method comprises enforcing the first control rule for the service with the enabled parameters.

Aligned with advantageous embodiments of the method executed by the control server and discussed above, corresponding advantageous embodiments are provided for this method executed by the enforcing device.

In an embodiment, this method may comprise a step of receiving from the control server, prior to receiving the modified control rule for the service, a further control rule for a further service or application, both hereinafter indistinctly referred to as the further service, wherein the further control rule comprises the particular parameter amongst a plurality of further parameters to be used for enforcement of the further control rule for the further service, a step of installing the further control rule and a step of enforcing the further control rule for the further service by enabling the plurality of further parameters.

As commented above in respect of the first control rule, also the plurality of further parameters of a further control rule may indicate any one of further policy control, charging information, sponsoring information, quality of service and combinations thereof.

In this embodiment, upon receiving the modified control rule with the removal indicator indicating the particular parameter to be removed for the first control rule previously installed, this method may further comprise maintaining the plurality of further parameters previously enabled, without removing the particular parameter, for the further control rule.

As for the method executed by the control server, a further advantageous embodiment is provided for this method executed by the enforcing device. This further advantageous embodiment is useful when the particular parameter shared by more than one control rule is a monitoring key included in the more than one control rule.

In this further embodiment, the first control rule and the further control rule may include a common monitoring key associated with the service and with the further service. In this case, receiving the first control rule and the further control rule from the control server may include receiving a usage threshold, hereinafter referred to as monitoring quota, associated with the common monitoring key, and this method may further comprise monitoring user traffic for the service and the further service using the monitoring quota.

Further in this embodiment, the removal indicator in the modified control rule may indicate the common monitoring key. In this case, the common monitoring key is removed for the first control rule and maintained for the further control rule previously installed, and the user traffic is monitored for the further service and not monitored for the service.

In other embodiment, instead of the monitoring key, the removal indicator in the modified control rule may indicate a policy-related, charging-related, QoS-related or sponsor-related parameter, which is included at least in the first control rule. In this case, the corresponding policy-related, charging-related, QoS-related or sponsor-related parameter is removed only for the first control rule previously submitted.

Other embodiments are provided for this method executed by the enforcing device and which are aligned with embodiments of the method executed by the control server.

In an embodiment of this method, the control server may be a PCRF server.

In an embodiment of this method, the control rules may be ADC rules and the enforcing device may be a TDF device. In another, the control rules may be PCC rules and the enforcing device may be a PCEF device. In still another, the control rules may be QoS rules and the enforcing device may be a BBERF device.

In accordance with a third aspect of the present invention, there is provided a control server for providing control rules for services and applications in a PCC architecture.

This control server comprises a rules handler configured to determine a first control rule for a service or application, both hereinafter indistinctly referred to as the service, wherein the first control rule comprises a plurality of parameters to be used for enforcement of the first control rule for the service, and a transmitter configured to submit the first control rule to an enforcing device.

Aligned with the above methods, the plurality of parameters of the first control rule may indicate any one of policy control, charging information, sponsoring information, quality of service and combinations thereof.

The rules handler in this control server, upon determining that a particular parameter, amongst the plurality of parameters, is no longer applicable for the first control rule, is configured to determine a modified control rule that includes a removal indicator indicating the particular parameter to be removed for the first control rule previously submitted, and the transmitter is configured to submit the modified control rule to the enforcing device.

In order to carry out advantageous embodiments for the above methods, corresponding embodiments for this control server are provided.

In an embodiment, the rules handler may be configured to, prior to determining that the particular parameter is no longer applicable for the first control rule, determine a further control rule for a further service or application, both hereinafter indistinctly referred to as the further service, the further control rule comprising the particular parameter amongst a plurality of further parameters to be used for enforcement of the further control rule for the further service, and the transmitter may be configured to submit the further control rule to the enforcing device.

As commented above in respect of the first control rule, also the plurality of further parameters of a further control rule may indicate any one of further policy control, charging information, sponsoring information, quality of service and combinations thereof.

In this embodiment, the rules handler may be configured to, upon determining that the particular parameter is no longer applicable for the first control rule, determine that the particular parameter is still applicable for the further control rule so that a modified further control rule with the removal indicator is not required.

Particularly advantageous for embodiments of the methods discussed above, the control server may further comprise a tracker configured to identify a common monitoring key associated with the service and with the further service and determine a usage threshold, hereinafter referred to as monitoring quota, associated with the common monitoring key. In this case, the rules handler may be configured to include the common monitoring key in the first control rule and the further control rule, and the transmitter may be configured to submit the monitoring quota associated with the common monitoring key, along with the first control rule and the further control rule, to the enforcing device.

Further in this embodiment, the particular parameter no longer applicable for the first control rule may be the common monitoring key included in the first control rule and the further control rule. In this case, the removal indicator included in the modified control rule may indicate the common monitoring key, which is to be removed at the enforcing device only for the first control rule and not for the further control rule previously submitted.

In other embodiments, instead of the monitoring key, the particular parameter no longer applicable for the first control rule may be a policy-related, charging-related, QoS-related or sponsor-related parameter included, at least, in the first control rule. In this case, the removal indicator included in the modified control rule may indicate the corresponding policy-related, charging-related, QoS-related or sponsor-related parameter, which is to be removed at the enforcing device only for the first control rule previously submitted.

In an embodiment of the control server, the control server may be a PCRF server.

In an embodiment of the control server, the control rules may be ADC rules and the enforcing device may be a TDF device. In another, the control rules may be PCC rules and the enforcing device may be a PCEF device. In still another, the control rules may be QoS rules and the enforcing device may be a BBERF device.

In accordance with a fourth aspect of the present invention, there is provided an enforcing device for enforcement of control rules for services and applications in a PCC architecture.

This enforcing device comprises a receiver configured to receive, from a control server, a first control rule for a service or application, both hereinafter indistinctly referred to as the service, wherein the first control rule comprises a plurality of parameters to be used for enforcement of the first control rule for the service, and a rules handler configured to install the first control rule and enforce the first control rule for the service by enabling the plurality of parameters.

Aligned with the above methods, the plurality of parameters of the first control rule may indicate any one of policy control, charging information, sponsoring information, quality of service and combinations thereof.

In this enforcing device, the receiver is configured to receive, from the control server, a modified control rule for the service, wherein the modified control rule includes a removal indicator indicating a particular parameter to be removed for the first control rule previously installed.

In this enforcing device, the rules handler is configured to remove the particular parameter indicated by the removal indicator for the first control rule previously installed and, if any additional parameter is included in the modified control rule, the rules handler is configured to enable the additional parameter for the first control rule previously installed. With or without additional parameters, the rules handler is configured to enforce the first control rule for the service with the enabled parameters.

In order to carry out advantageous embodiments for the above methods, corresponding embodiments for this enforcing device are provided and discussed in the following.

In an embodiment, the receiver may be configured to receive from the control server, prior to receiving the modified control rule for the service, a further control rule for a further service or application, both hereinafter indistinctly referred to as the further service, wherein the further control rule comprises the particular parameter amongst a plurality of further parameters to be used for enforcement of the further control rule for the further service, and the rules handler may be configured to install the further control rule and enforce the further control rule for the further service by enabling the plurality of further parameters.

As commented above in respect of the first control rule, also the plurality of further parameters of a further control rule may indicate any one of further policy control, charging information, sponsoring information, quality of service and combinations thereof.

In this embodiment, upon receiving by the receiver the modified control rule with the removal indicator indicating the particular parameter to be removed for the first control rule previously installed, the rules handler may be configured to maintain the plurality of further parameters previously enabled, without removing the particular parameter, for the further control rule.

Particularly advantageous for embodiments of the methods discussed above, the first control rule and the further control rule may include a common monitoring key associated with the service and with the further service. In this case, the receiver receiving the first control rule and the further control rule from the control server may be configured to receive a usage threshold, hereinafter referred to as monitoring quota, associated with the common monitoring key, and the enforcing device may further comprise a tracker configured to monitor user traffic for the service and the further service using the monitoring quota.

Further in this embodiment, the removal indicator in the modified control rule may indicate the common monitoring key. In this case, the rules handler may be configured to remove the common monitoring key for the first control rule and maintain the common monitoring key for the further control rule previously installed, and the tracker may be configured to monitor the user traffic for the further service and not for the service.

In other embodiments, instead of the monitoring key, the removal indicator in the modified control rule may indicate a policy-related, charging-related, QoS-related or sponsor-related parameter, which is included at least in the first control rule. In this case, the rules handler may be configured to remove the corresponding policy-related, charging-related, QoS-related or sponsor-related parameter only for the first control rule previously submitted.

In an embodiment of the enforcing device, the control server may be a PCRF server.

In an embodiment of the enforcing device, the control rules may be ADC rules and the enforcing device may be a TDF device. In another, the control rules may be PCC rules and the enforcing device may be a PCEF device. In still another, the control rules may be QoS rules and the enforcing device may be a BBERF device.

In accordance with a fifth aspect of the present invention, there is provided a computer program comprising instructions which, when executed on at least one processor, cause the at least one processor to carry out the method for modifying a control rule for a service or application in a PCC architecture, the method executed by the control server.

In accordance with a sixth aspect of the present invention, there is provided a computer program comprising instructions which, when executed on at least one processor, cause the at least one processor to carry out the method for modifying a control rule for a service or application in a PCC architecture, the method executed by the enforcing device.

BRIEF DESCRIPTION OF THE DRAWINGS

The features, objects and advantages of the invention will become apparent by reading this description in conjunction with the accompanying drawings, in which:

FIG. 5 shows a second exemplary sequence of actions that may be carried out in accordance with the embodiments of the methods illustrated in FIG. 2 and FIG. 3.

FIG. 6 shows a basic component structure of a control server.

FIG. 7 shows a basic component structure of an enforcing device.

FIG. 8 basically illustrates a method for modifying a control rule for a service or application in the PCC architecture, the method carried out at a control server.

FIG. 9 basically illustrates a method for modifying a control rule for a service or application in the PCC architecture, the method carried out at an enforcing device.

DETAILED DESCRIPTION

Figure 1:
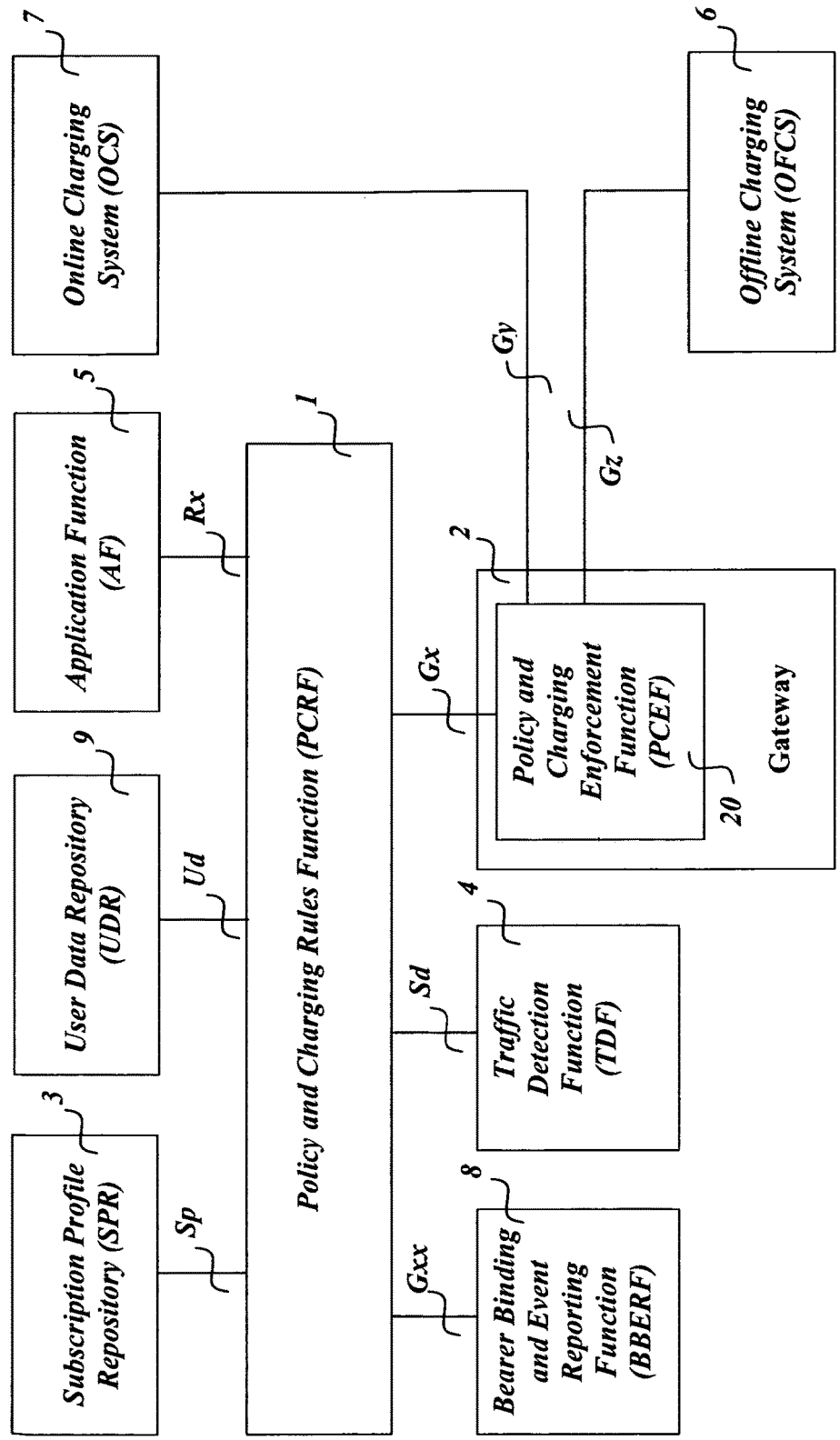
FIG. 1 illustrates a PCC architecture in accordance with 3GPP TS 23.203 V13.0.1, the PCC architecture complemented with a UDR in accordance with 3GPP TS 23.335 v12.0.0.

The following describes currently preferred embodiments of a control server, an enforcing device, a method carried out at the control server for modifying a control rule for a service or application in the PCC architecture, and a method carried out at the enforcing device for enforcement of a modified control rule for a service or application in the PCC architecture. In particular, the control server may be a PCRF server 1 of the PCC architecture. Also in particular, the enforcing device may be any one of a PCEF device 20, a BBERF device 8 and a TDF device 4 of the PCC architecture.

Moreover, the PCEF device 20, the BBERF device 8 and TDF device 4 may co-exist in at least some embodiments discussed throughout this specification so that nothing prevents the control server from communicating with more than one enforcing device, even if not all the exemplary enforcing devices are illustrated in drawings.

FIG. 8 illustrates a method for modifying a control rule for a service or application in the PCC architecture, the method carried out at a control server. For the sake of simplicity, both service and application are hereinafter indistinctly referred to as the service.

As shown in FIG. 8, the control server 1' determines during a step S-805 a first control rule CR for the service, wherein the first control rule comprises a plurality of parameters to be used for enforcement of the first control rule for the service.

Generally speaking, and throughout this specification, the plurality of parameters of a control rule, i.e. a plurality of control rule parameters, may indicate any one of policy control, charging information, sponsoring information, quality of service and combinations thereof for the service.

Then, the control server 1' submits to the enforcing device 4' or 20' during a step S-810 the first control rule CR with its plurality of parameters.

In particular, the first control rule CR may be submitted to the enforcing device in a Credit-Control-Answer (CCA) command in response to a Credit-Control-Request (CCR) command previously received from the enforcing device to request control rules. Alternatively, the first control rule CR may be submitted to the enforcing device in a Re-Authentication-Request (RAR) command if the submission is initiated by the control server on its own without request from the enforcing device, e.g. due to an internal trigger.

The first control rule CR, which comprises the plurality of parameters to be used for enforcement of the first control rule for the service, is received at the enforcing device 4' or 20' during a step S-910 as illustrated in FIG. 9.

FIG. 9 illustrates a method for enforcement of a modified control rule for a service or application in the PCC architecture, the method carried out at an enforcing device. For the sake of simplicity, both service and application are hereinafter indistinctly referred to as the service.

As shown in FIG. 9, upon receipt during the step S-910 of the first control rule CR, the enforcing device installs during a step S-915 the first control rule and enforces during a step S-920 the first control rule for the service by enabling the plurality of parameters. As particularly commented above, the first control rule may be received in a CCA command or in a RAR command.

Back to the sequence of actions illustrated in FIG. 8 and not yet commented, the control server 1' further determines during a step S-815 that a particular parameter, amongst the plurality of parameters, is no longer applicable for the service and is thus no longer applicable for the first control rule. In particular, the determination that a particular parameter is no longer applicable for the service may occur as an internal policy in the control server (e.g. based on subscription data or operator policies) or based on information received from a network node (e.g. location change, RAT Type change, etc.).

Then, the control server 1' determines during a step S-820 a modified control rule CR' that includes a removal indicator indicating the particular parameter to be removed for the first control rule previously submitted, and submits during a step S-825 the modified control rule CR' to the enforcing device 4' or 20'.

The modified control rule CR', which includes the removal indicator indicating the particular parameter to be removed for the first control rule previously installed, is received at the enforcing device 4' or 20' during a step S-925 as illustrated in FIG. 9. The modified control rule may be received in a CCA command or in a RAR command. Moreover, and particularly applicable to Gx, Sd and Gxx reference points discussed above, the removal indicator may thus be included in Gx/Sd/Gxx CCA commands as well as in Gx/Sd/Gxx RAR commands.

As shown in FIG. 9, upon receipt during the step S-925 of the modified control rule CR', the enforcing device removes during a step S-930 the particular parameter indicated by the removal indicator for the first control rule previously installed.

Then, if any additional parameter is included in the modified control rule, the enforcing device enables during a step S-935 the additional parameter for the first control rule previously installed.

At this stage, the enforcing device enforces during a step S-940 the first control rule for the service with the enabled parameters.

Figure 2:
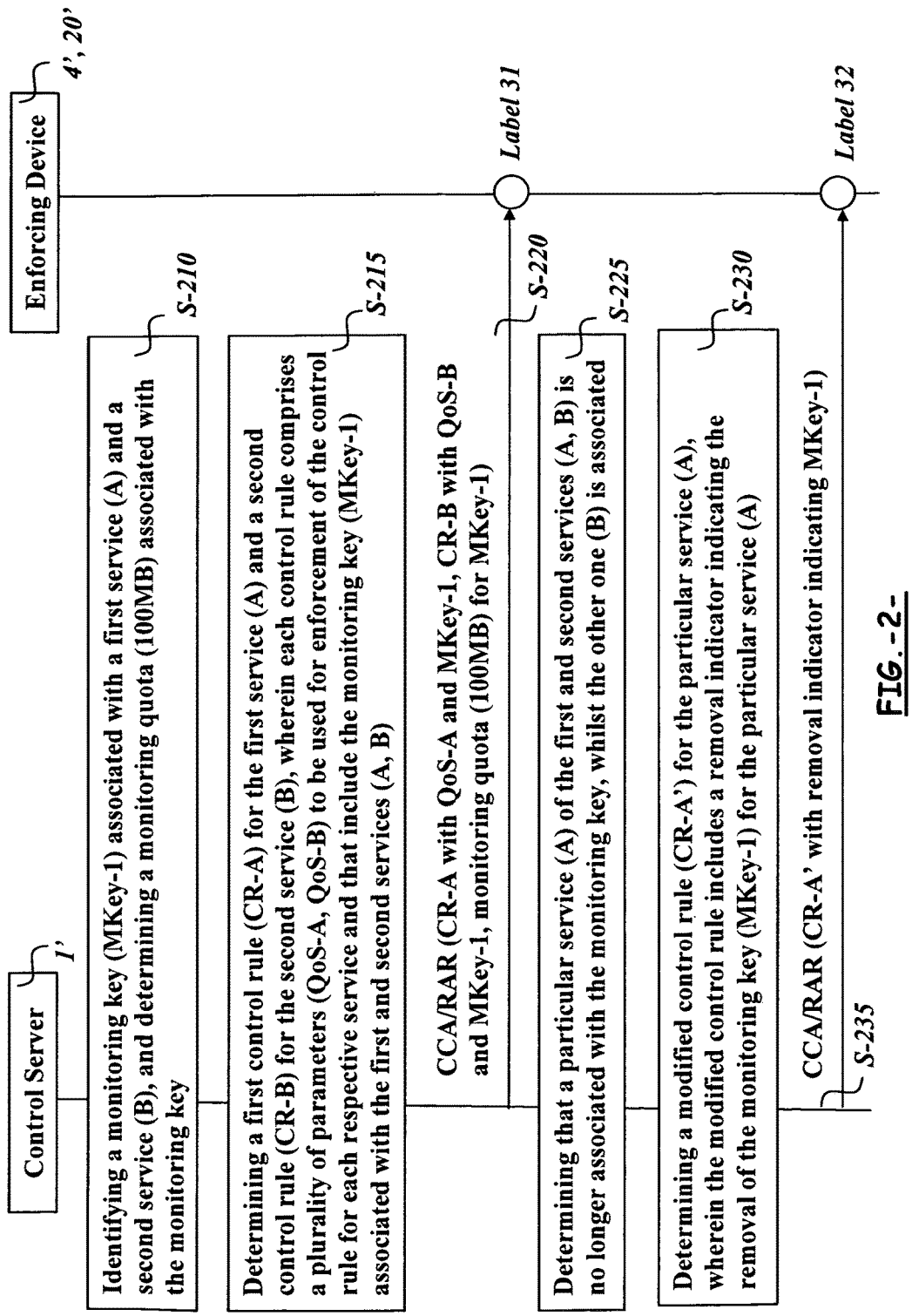
FIG. 2 represents an embodiment of a method for modifying a control rule for a service or application in the PCC architecture, the method carried out at a control server.
Figure 3:
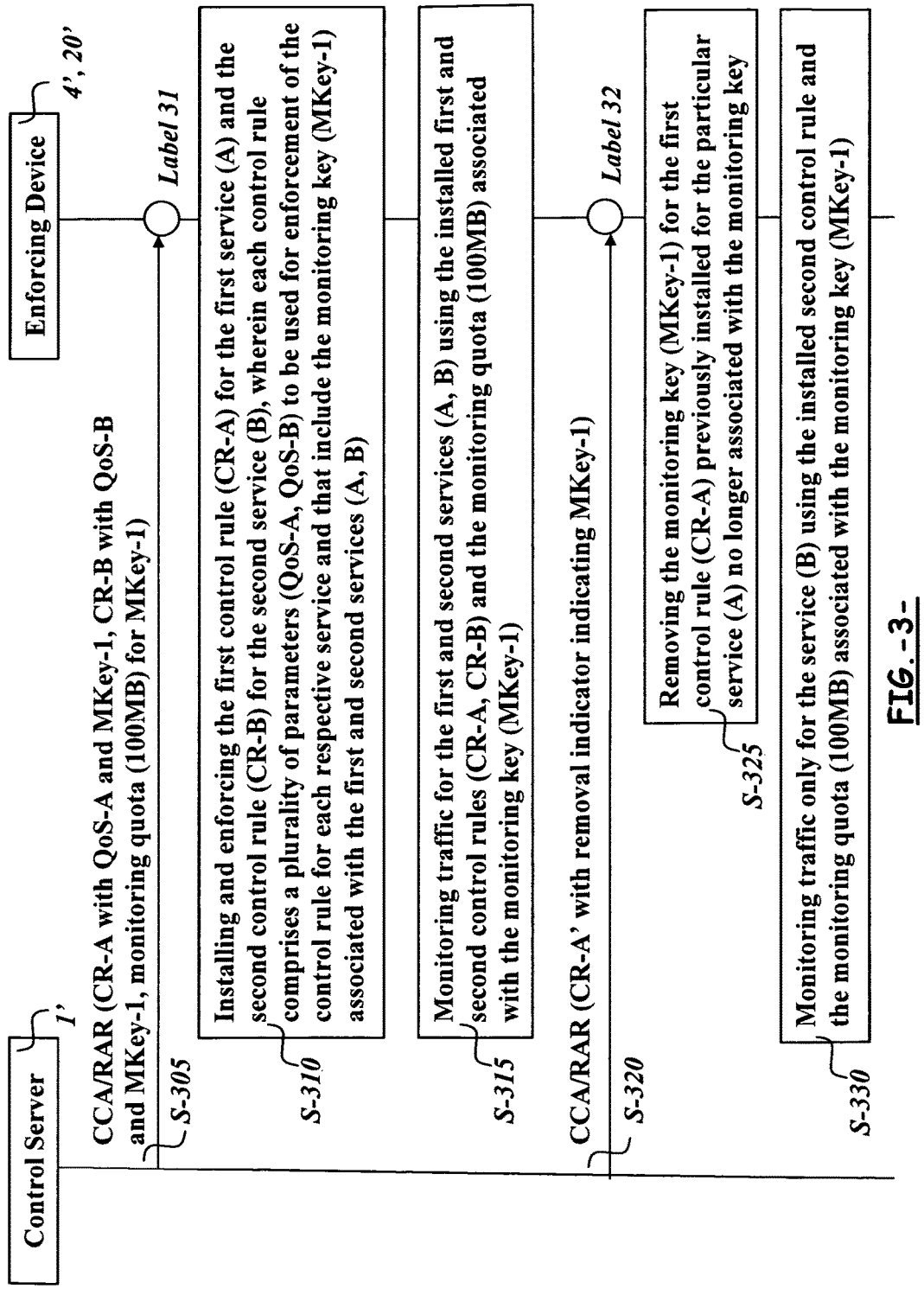
FIG. 3 represents an embodiment of a method for modifying a control rule for a service or application in the PCC architecture, the method carried out at an enforcing device.

In particular, the removal indicator may indicate any policy-related, charging-related, QoS-related or sponsor-related parameter for a control rule. For example, the removal indicator may indicate removal of a service identifier or a rating group amongst defined charging-related parameters for a control rule. Also for example, the removal indicator may indicate any one of Sharing-Key-UL and Sharing-Key-DL, which had been commented above, FIG. 2 illustrates an exemplary embodiment of the method illustrated in FIG. 8 for modifying a control rule for a service or application in the PCC architecture, the method carried out at the control server 1'. FIG. 3 illustrates a corresponding exemplary embodiment of the method illustrated in FIG. 9 for enforcement of a modified control rule for a service or application in the PCC architecture, the method carried out at the enforcing device 4' or 20'.

The exemplary embodiments illustrated in FIG. 2 and FIG. 3 address the case in which a same parameter amongst the plurality of parameters, or rather a same parameter value for the parameter, is shared by more than one control rule and there is a need to remove the parameter for one control rule and not for the others. In these exemplary embodiments this same parameter is a same monitoring key associated with two different services.

As shown in FIG. 2, the control sever 1' identifies during a step S-210 a monitoring key MKey-1 associated with a first service A and with a second service B, and the control server determines a monitoring quota of 100 MB associated with said monitoring key.

The control server then determines during a step S-215 a first control rule CR-A for the first service A and a second control rule CR-B for the second service B, wherein each one of the first and second control rules comprises a plurality of parameters, i.e. QoS-A or QoS-B, to be used for enforcement of the control rule for each respective service, and wherein the respective plurality of parameters for the first and second control rules also include the monitoring key MKey-1 associated with the first and the second services A and B.

Then, the control server 1' submits to the enforcing device 4' or 20' during a step S-220 the first control rule CR-A with its plurality of parameters QoS-A and including the monitoring key MKey-1, the second control rule CR-B with its plurality of parameters QoS-B and including the monitoring key MKey-1, and the monitoring quota of 100 MB associated with said monitoring key MKey-1.

In particular, as commented above with reference to FIG. 8 and FIG. 9, the first control rule CR-A and the second control rule CR-B may be submitted to the enforcing device in a CCA command in response to a CCR command previously received from the enforcing device to request control rules. Alternatively, the first control rule CR-A and the second control rule CR-B may be submitted to the enforcing device in a RAR command if the submission is initiated by the control server on its own without request from the enforcing device, e.g. due to an internal trigger.

These first control rule CR-A and second control rule CR-B, as well as the monitoring quota associated with the monitoring key MKey-1, are received at the enforcing device 4' or 20' during a step S-305 illustrated in FIG. 3.

As shown in FIG. 3, upon receipt during the step S-305 of the first control rule CR-A, the second control rule CR-B, and the monitoring quota of 100 MB associated with the monitoring key MKey-1, the enforcing device installs during a step S-310 the first control rule CR-A for the first service A and the second control rule CR-B, for the second service B, wherein each control rule comprises a respective plurality of parameters to be used for enforcement of the control rule for each respective service and that include the monitoring key MKey-1 associated with the first and second services.

As particularly commented above, the first control rule CR-A, the second control rule CR-B, and the monitoring quota of 100 MB associated with the monitoring key MKey-1 may be received at the enforcing device in a CCA command or in a RAR command.

Then, the enforcing device 4' or 20' monitors during a step S-315 traffic for the first service A and for the second service B using the installed first control rule CR-A and second control rule CR-B, and the monitoring quota of 100 MB associated with the monitoring key MKey-1.

Back to the sequence of actions illustrated in FIG. 2 and not yet commented, the control server 1' further determines during a step S-225 that a particular service A of the first and second services is no longer associated with the monitoring key MKey-1, whilst the other service B is still associated with the monitoring key MKey-1.

Then, the control server 1' determines during a step S-230 a modified control rule CR-A' for the particular service A, wherein the modified control rule includes a removal indicator indicating the removal of the monitoring key MKey-1 for the particular service A.

The control server 1' submits to the enforcing device 4' or 20', during a step S-235, the modified control rule CR-A' with the removal indicator indicating the removal of the monitoring key MKey-1. As before commented, this submission may be carried out in a CCA command or in a RAR command.

This modified control rule CR-A' with the removal indicator indicating the removal of the monitoring key MKey-1, is received at the enforcing device 4' or 20' during a step S-320 illustrated in FIG. 3.

As shown in FIG. 3, upon receipt during the step S-320 of the modified control rule CR-A' with the removal indicator indicating the removal of the monitoring key MKey-1, the enforcing device removes during a step S-325 the monitoring key MKey-1 for the first control rule CR-A previously installed for the particular service A, which is no longer associated with the monitoring key MKey-1, and keeps the monitoring key MKey-1 enabled for the second control rule CR-B previously installed for the other service B.

Then, the enforcing device monitors during a step S-330 traffic only for the other service B using the installed second control rule CR-B and the monitoring quota of 100 MB associated with the monitoring key MKey-1.

This embodiment commented above with reference to FIG. 2 and FIG. 3 may also be applied when the monitoring key to be removed applies to only one control rule. In principle, the existing mechanism specified in 3GPP TS 29.212 V13.0.0, whereby the PCRF can disable usage monitoring related to a monitoring key by providing a Usage-Monitoring-Information AVP to the PCEF/TDF indicating the affected monitoring key and an indication to disable monitoring, can be used to remove the monitoring key from the only one control rule. However, since there can be predefined control rules in the PCEF/TDF, which could also be related to that monitoring key, the methods commented above with reference to FIG. 8 and FIG. 9 are advantageous to remove the monitoring key from the only one control rule associated with the monitoring key.

Participating in the above methods and exemplary embodiments there is provided a control server 1', as schematically illustrated in FIG. 6.

As shown in FIG. 6, the control server 1' comprises a rules handler 122 configured to determine a first control rule for a service or application, both service and application hereinafter indistinctly referred to as the service, wherein the first control rule comprises a plurality of parameters to be used for enforcement of the first control rule for the service.

The control server 1' shown in FIG. 6 also comprises a transmitter 130 configured to submit the first control rule to an enforcing device 4' or 20'. Both rules handler 122 and transmitter 130 are in communication with each other and with other elements or units of the control server 1'.

In this control server 1', upon determining at the rules handler that a particular parameter, amongst the plurality of parameters, is no longer applicable for the first control rule, the rules handler 122 is configured to determine a modified control rule that includes a removal indicator indicating the particular parameter to be removed for the first control rule previously submitted, and the transmitter 130 is configured to submit the modified control rule to the enforcing device.

In order to align this control server with embodiments discussed above, in which a same parameter amongst the plurality of parameters, or rather a same parameter value for the parameter, is shared by more than one control rule and there is a need to remove the parameter for one control rule and not for the others, further combinable embodiments of the control server 1' are discussed in the following.

In a first embodiment, prior to determining that the particular parameter is no longer applicable for the first control rule, the rules handler 122 may be configured to determine a further control rule for a further service or application, both hereinafter indistinctly referred to as the further service, the further control rule comprising the particular parameter amongst a plurality of further parameters to be used for enforcement of the further control rule for the further service, and the transmitter 130 may be configured to submit the further control rule to the enforcing device.

In a second embodiment, upon determining that the particular parameter is no longer applicable for the first control rule, the rules handler 122 may be configured to determine that the particular parameter is still applicable for the further control rule so that a modified further control rule with the removal indicator is not required.

In a third embodiment, the control server 1' illustrated in FIG. 6 may further comprise a tracker 126 configured to identify a common monitoring key associated with the service and with the further service, and to determine a usage threshold, hereinafter referred to as monitoring quota, associated with the common monitoring key. In this third embodiment, the rules handler 122 may be configured to include the common monitoring key in the first control rule and the further control rule, and the transmitter 130 may be configured to submit the monitoring quota associated with the common monitoring key, along with the first control rule and the further control rule, to the enforcing device 4' or 20'.

Further in this third embodiment, the particular parameter no longer applicable for the first control rule may be the common monitoring key included in the first control rule and the further control rule, and the removal indicator included in the modified control rule may indicate the common monitoring key, which is to be removed at the enforcing device only for the first control rule and not for the further control rule previously submitted.

Alternatively, or complementary to any one of these embodiments, the particular parameter no longer applicable for the first control rule may be a policy-related, charging-related, QoS-related or sponsor-related parameter included, at least, in the first control rule, and wherein the removal indicator included in the modified control rule indicates the corresponding policy-related, charging-related, QoS-related or sponsor-related parameter, which is to be removed at the enforcing device only for the first control rule previously submitted.

The control server 1' shown in FIG. 6 may also comprise at least one processor 120 and at least one memory 110, both in communication with each other, with the rules handler 122, the tracker 126 and the transmitter 130, and with other elements or units of the control server 1'. The at least one memory 110 may comprise volatile and/or non-volatile memory. In particular, the at least one memory 110 may have a computer program 113 and data 117 stored therein. The computer program 113 may be loaded in the at least one memory 110 from a computer program product 100, such as any non-transitory computer readable medium, in which the computer program is stored. The data 117 may comprise one or more control rules defined at the control server 1'. The at least one processor 120 may be configured to carry out the functions of the rules handler 122 and the tracker 126.

Especially advantageous for a case where the control rules are provided upon request from the enforcing device 4' or 20', or for a case where subscription profiles are obtained from a SPR 3 or UDR 9, the control server 1' shown in FIG. 6 may also comprise a receiver 140 configured to receive, from the enforcing device, a request for control rules and, from the SPR 3 or UDR 9, subscription profiles. This receiver 140 may be also in communication with the at least one processor 120, the at least one memory 110, the rules handler 122, the tracker 126 and the transmitter 130, as well as with other elements or units of the control server 1'.

Also participating in the above methods and exemplary embodiments there is provided an enforcing device 4' or 20', which is schematically illustrated in FIG. 7.

As shown in FIG. 7, the enforcing device 4' or 20' comprises a receiver 290 configured to receive, from a control server 1', a first control rule for a service or application, both hereinafter indistinctly referred to as the service, wherein the first control rule comprises a plurality of parameters to be used for enforcement of the first control rule for the service.

The enforcing device 4' or 20' shown in FIG. 7 also comprises a rules handler 272 configured to install the first control rule and enforce the first control rule for the service by enabling the plurality of parameters.

In this enforcing device 4' or 20', the receiver 290 is further configured to receive, from the control server 1', a modified control rule for the service, wherein the modified control rule includes a removal indicator indicating a particular parameter to be removed for the first control rule previously installed.

In this enforcing device 4' or 20', the rules handler 272 is also configured to remove the particular parameter indicated by the removal indicator for the first control rule previously installed and, if any additional parameter is included in the modified control rule, the rules handler 272 is also configured to enable the additional parameter for the first control rule previously installed. Moreover, the rules handler 272 is also configured to enforce the first control rule for the service with the enabled parameters.

In order to align this enforcing device with embodiments discussed above, in which a same parameter amongst the plurality of parameters, or rather a same parameter value for the parameter, is shared by more than one control rule and there is a need to remove the parameter for one control rule and not for the others, further combinable embodiments of the enforcing device 4' or 20' are discussed in the following.

In a first embodiment, prior to receiving the modified control rule for the service, the receiver 290 may be configured to receive from the control server a further control rule for a further service or application, both hereinafter indistinctly referred to as the further service, wherein the further control rule comprises the particular parameter amongst a plurality of further parameters to be used for enforcement of the further control rule for the further service, and the rules handler 272 may be configured to install the further control rule and enforce the further control rule for the further service by enabling the plurality of further parameters.

In a second embodiment, upon receiving by the receiver 290 the modified control rule with the removal indicator indicating the particular parameter to be removed for the first control rule previously installed, the rules handler 272 may be configured to maintain the plurality of further parameters previously enabled, without removing the particular parameter, for the further control rule.

In a third embodiment, the first control rule and the further control rule may include a common monitoring key associated with the service and with the further service, the receiver 290 receiving the first control rule and the further control rule from the control server may be configured to receive a usage threshold, hereinafter referred to as monitoring quota, associated with the common monitoring key, and the enforcing device may further comprise a tracker 276 configured to monitor user traffic for the service and the further service using the monitoring quota.

Further in this third embodiment, the removal indicator in the modified control rule may indicate the common monitoring key, the rules handler 272 may be configured to remove the common monitoring key for the first control rule and maintain the common monitoring key for the further control rule previously installed, and the tracker 276 may be configured to monitor the user traffic for the further service and not for the service.

Alternatively, or complementary to any one of these embodiments, the removal indicator in the modified control rule may indicate a policy-related, charging-related, QoS-related or sponsor-related parameter, which is included at least in the first control rule, and the rules handler 272 may be configured to remove the policy-related, charging-related, QoS-related or sponsor-related parameter only for the first control rule previously submitted.

The enforcing device 4' or 20' shown in FIG. 7 may also comprise at least one processor 270 and at least one memory 260, both in communication with each other, with the rules handler 272, the tracker 276 and the receiver 290, and with other elements or units of the enforcing device 4' or 20'. The at least one memory 260 may comprise volatile and/or non-volatile memory. In particular, the at least one memory 260 may have a computer program 264 and data 268 stored therein. The computer program 264 may be loaded in the at least one memory 260 from a computer program product 250, such as any non-transitory computer readable medium, in which the computer program is stored. The data 268 may comprise one or more control rules to be enforced by the enforcing device 4' or 20'. The at least one processor 270 may be configured to carry out the functions of the rules handler 272 and the tracker 276.

Especially advantageous for a case where the control rules are requested to the control server 1', the enforcing device 4' or 20' shown in FIG. 7 may also comprise a transmitter 280 configured to submit, to the control server, a request for control rules. This transmitter 280 may be also in communication with the at least one processor 270, the at least one memory 260, the rules handler 272, the tracker 276 and the receiver 290, as well as with other elements or units of the enforcing device 4' or 20'.

Figure 4:
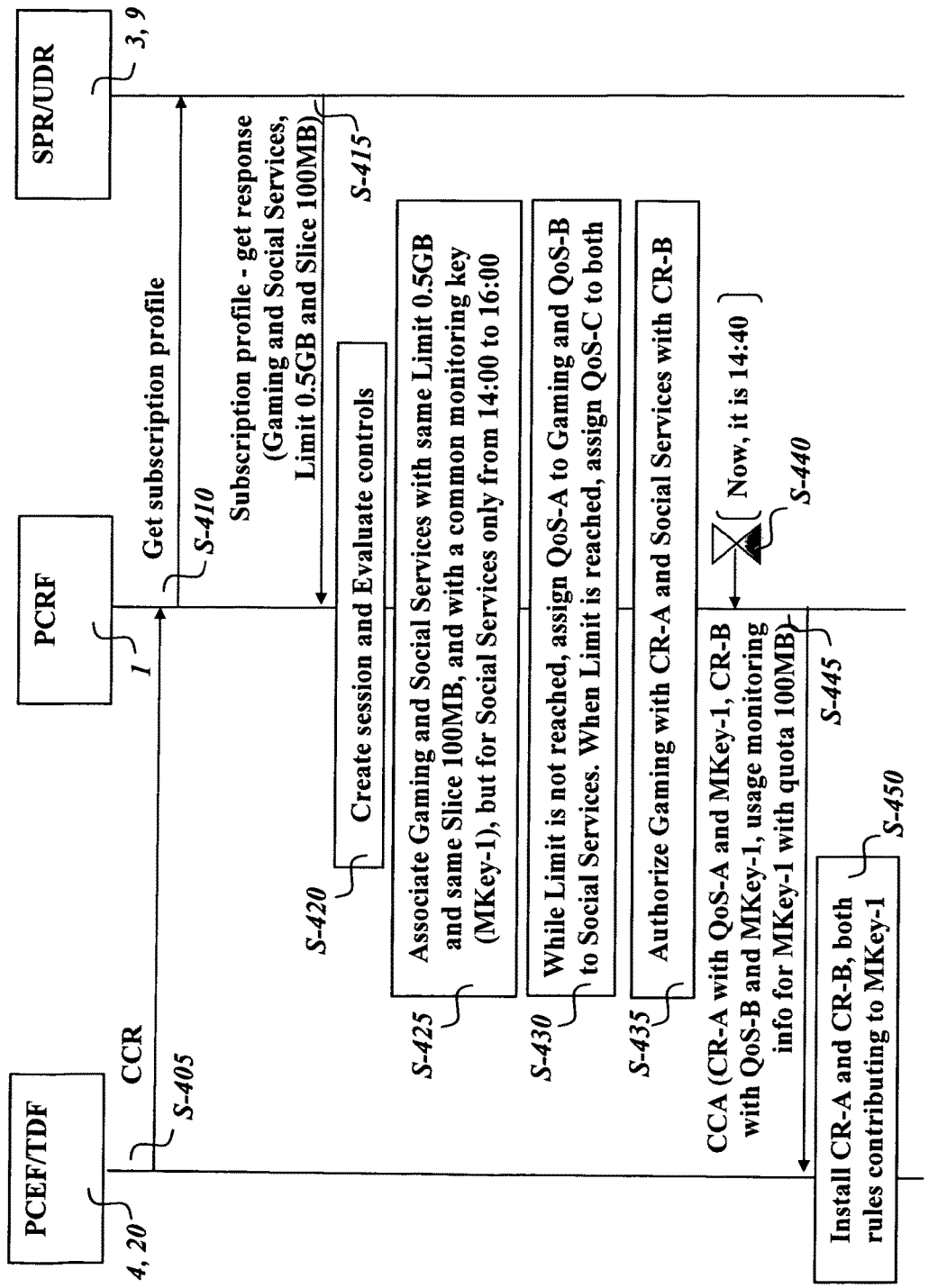
FIG. 4 shows a first exemplary sequence of actions that may be carried out in accordance with the embodiments of the methods illustrated in FIG. 2 and FIG. 3.

FIG. 4 and FIG. 5 illustrate a further exemplary embodiment of the method for modifying a control rule for a service or application in the PCC architecture and the method for enforcement of a modified control rule for a service or application in the PCC architecture. These methods are respectively carried out at a PCRF server 1, acting as control server 1', and at a PCEF/TDF device 4 or 20 acting as enforcing device 4' or 20'.

The exemplary embodiments illustrated in FIG. 4 and FIG. 5 address a case in which a subscription is provisioned with two services for a user, e.g. Gaming 'A' and Social Services 'B', and the subscription has an offer that authorizes both services with the following conditions: QoS-A for Gaming and QoS-B for Social Services, whenever the user does not consume more than 0.5 GB for both services together; and, when this limit of 0.5 GB is surpassed, QoS-C for both services. In addition, policies are provided to monitor usage of the Gaming at any time and usage of the Social Services between 14:00 and 16:00.

As illustrated in FIG. 4, the PCEF/TDF device 4 or 20 submits during a step S-405 a CCR command, as a request for control rules, to the PCRF server 1. The PCRF server 1 requests during a step S-410 a subscription profile to the SPR/UDR 3 or 9.

The PCRF server 1 receives the subscription profile during a step S-415, including Gaming and Social Services as subscribed services, a fair usage profile with a limit of 0.5 GB and a threshold or slice value, i.e. monitoring quota, of 100 MB.

The PCRF server creates a session and evaluates controls for the session during a step S-420. In this respect, during a step S-425, the PCRF server associates Gaming and Social Services with the same limit of 0.5 GB, with the same monitoring quota of 100 MB, and with a same monitoring key MKey-1. This same monitoring key MKey-1 is associated with Social Services only from 14:00 to 16:00.

As anticipated above, the PCRF server assigns during a step S-430 a QoS-A to Gaming and a QoS-B to Social Services while the 0.5 GB limit is not reached. When said limit is reached a QoS-C will be assigned to both services.

Then, the PCRF server authorizes during a step S-435 Gaming with a control rule CR-A and Social Services with a control rule CR-B. Now, it is 14:40, the PCRF server determines during a step S-440 that the monitoring key MKey-1 is applicable to both Gaming and Social Services.

The PCRF server 1 submits during a step S-445, to the PCEF/TDF device 4 or 20, a CCA command with the control rule CR-A for Gaming with QoS-A parameters and the monitoring key MKey-1, the control rule CR-B for Social Services with QoS-B parameters and the monitoring key MKey-1, and usage monitoring information for the MKey-1 with monitoring quota of 100 MB.

The PCEF/TDF device installs during a step S-450 the CR-A and CR-B received from the PCRF server 1. Both control rules CR-A and CR-B contributing to monitor traffic for the monitoring key MKey-1 with monitoring quota of 100 MB.

Later, as illustrated in FIG. 5, the PCRF server 1 detects during a step S-505 it is 16:00, requests a subscription profile during a step S-510 to the SPR/UDR 3 or 9, and receives the subscription profile during a step S-515.

The PCRF server re-authorizes the session and re-evaluates the controls for the session during a step S-520. In this respect, during a step S-525, the PCRF server determines that Gaming is still associated with the same limit of 0.5 GB, the same monitoring quota of 100 MB, and the same monitoring key MKey-1, and that Social Services is no longer associated with the monitoring key MKey-1 until 14:00 on next day.

Since the limit of 0.5 GB is not reached yet, the PCRF server 1 determines during a step S-530 that QoS-A is still assigned to Gaming and QoS-B is still assigned to Social Services.

Given that the monitoring key MKey-1 is still enforced with the control rule CR-B at the PCEF/TDF device, and given that this monitoring key MKey-1 is no longer associated with the Social Services, the PCRF server re-authorizes during a step S-535 Social Services with a modified control rule CR'-B that indicates the removal of the monitoring key MKey-1 for the control rule CR-B previously installed.

To this end, the PCRF server 1 submits to the PCEF/TDF device 4 or 20, during a step S-540, a RAR command with the modified control rule CR'-B that includes a removal indicator indicating the monitoring key MKey-1.

The PCEF/TDF device removes during a step S-545 the monitoring key MKey-1 from the previously installed CR-B. From now on, only CR-A contributes to monitor traffic for the monitoring key MKey-1 with monitoring quota of 100 MB. Eventually, the PCEF/TDF device confirms the removal during a step S-550.

In accordance with an embodiment of the invention, the removal indicator may be implemented with a new Removal-Data AVP within the Charging-Rule-Definition AVP in the Gx reference point, within the QoS-Rule-Definition AVP in the Gxx reference point and within the ADC-Rule-Definition AVP in the Sd reference point.

For example, the new Charging-Rule-Definition AVP may look like:

| Charging-Rule-Definition ::= < AVP Header: 1003 > |
|---|
| { Charging-Rule-Name } |
| [ Service-Identifier ] |
| [ Rating-Group ] |
| *[ Flow-Information ] |
| [ TDF-Application-Identifier ] |
| [ Flow-Status ] |
| [ QoS-Information ] |
| [ PS-to-CS-Session-Continuity ] |
| [ Reporting-Level ] |
| [ Online ] |
| [ Offline ] |
| [ Metering-Method ] |
| [ Precedence ] |
| [ AF-Charging-Identifier ] |
| *[ Flows ] |
| [ Monitoring-Key] |
| [ Redirect-Information ] |
| [ Mute-Notification ] |
| [ AF-Signalling-Protocol ] |

| Charging-Rule-Definition ::= < AVP Header: 1003 > |
|---|
| [ Sponsor-Identity ] |
| [ Application-Service-Provider-Identity ] |
| *[ Required-Access-Info ] |
| [ Removal-Data ] |
| *[ AVP ] |

The new Removal-Data AVP can be defined as a grouped AVP in order to allow the extension of additional data that may be required to be removed. For instance:

| Removal-Data ::= < AVP Header: nnnn > |
|---|
| [ Monitoring-Key] |
| [ Service-Identifier ] |
| [ QoS-information ] |
| [ Sharing-Key-UL ] |
| [ Sharing-Key-DL ] |
| *[ AVP ] |

When the information applies to a group of control rules, or when the affected control rules are predefined, i.e. the content of the control rule is not sent over the reference point but only an identifier of the control rule, it is also possible to include the new Removal-Data AVP as part of the Charging-Rule-Install AVP in the Gx reference point, as part of the QoS-Rule-Install AVP in the Gxx reference point and as part of the ADC-Rule-Install AVP in the Sd reference point. That way the monitoring key included within the Removal-Data AVP will be removed for all the rules identified with the Charging-Rule-Name, i.e. dynamic and predefined PCC Rules, or Charging-Rule-Base-Name, i.e. predefined PCC Rules. For example:

| Charging-Rule-Install ::= < AVP Header: 1001 > |
|---|
| *[ Charging-Rule-Definition ] |
| *[ Charging-Rule-Name ] |
| *[ Charging-Rule-Base-Name ] |
| [ Bearer-Identifier ] |
| [ Rule-Activation-Time ] |
| [ Rule-Deactivation-Time ] |
| [ Resource-Allocation-Notification ] |
| [ Charging-Correlation-Indicator ] |
| [ Removal-Data ] |
| *[ AVP ] |

In an embodiment of the invention, the Removal-Data AVP can be included at command level in order to apply a similar mechanism for information related to the IP-CAN session.

The invention may also be practised by a computer program, loadable into an internal memory of a computer with input and output units as well as with a processing unit. This computer program comprises executable code adapted to carry out the above method steps when running in the computer. In particular, the executable code may be recorded in a carrier readable means in a computer.

As used throughout the present specification, the words "comprising" and "including" do not exclude, the presence of other elements or steps than those listed, and the words "a" or "an" preceding an element do not exclude the presence of a plurality of such elements. Further, any reference signs do not limit the scope of the claims. Still further, the invention may be implemented at least in part by means of both hardware and software, and several structural components may be represented by a same item of hardware.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for modifying a control rule for a service or application in a Policy and Charging Control, PCC, architecture, the method executed by a control server and comprising the steps of:
   determining a first control rule for a service or application, both hereinafter indistinctly referred to as the service, wherein the first control rule comprises a plurality of parameters to be used for enforcement of the first control rule for the service;
   submitting the first control rule to an enforcing device;
   upon determining that a particular parameter, amongst the plurality of parameters, is no longer applicable for the first control rule, determining a modified control rule that includes a removal indicator indicating the particular parameter to be removed for the first control rule previously submitted; and
   submitting the modified control rule to the enforcing device.

2. The method of claim 1, further comprising:
   prior to determining that the particular parameter is no longer applicable, determining a further control rule for a further service or application, both hereinafter indistinctly referred to as the further service, wherein the further control rule comprises the particular parameter amongst a plurality of further parameters to be used for enforcement of the further control rule for the further service; and
   submitting the further control rule to the enforcing device.

3. The method of claim 2, further comprising, upon determining that the particular parameter is no longer applicable for the first control rule, determining that the particular parameter is still applicable for the further control rule so that a modified further control rule with the removal indicator is not required.

4. The method of claim 2, further comprising
   identifying a common monitoring key associated with the service and with the further service;
   determining a usage threshold, hereinafter referred to as monitoring quota, associated with the common monitoring key;
   wherein the first control rule and the further control rule include the common monitoring key; and
   wherein submitting the first control rule and the further control rule to the enforcing device includes submitting the monitoring quota associated with the common monitoring key.

5. The method of claim 4, wherein the particular parameter no longer applicable for the first control rule is the common monitoring key included in the first control rule and the further control rule, and wherein the removal indicator included in the modified control rule indicates the common monitoring key, which is to be removed only for the first control rule and not for the further control rule previously submitted.

6. The method of claim 1, wherein the particular parameter no longer applicable for the first control rule is a policy-related, charging-related, QoS-related or sponsor-related parameter included, at least, in the first control rule, and wherein the removal indicator included in the modified control rule indicates the corresponding policy-related, charging-related, QoS-related or sponsor-related parameter, which is to be removed only for the first control rule previously submitted.

7. A method for enforcement of a modified control rule for a service or application in a Policy and Charging Control, PCC, architecture, the method executed by an enforcing device and comprising the steps of:
   receiving a first control rule for a service or application, both hereinafter indistinctly referred to as the service, from a control server, wherein the first control rule comprises a plurality of parameters to be used for enforcement of the first control rule for the service;
   installing the first control rule and enforcing the first control rule by enabling the plurality of parameters;
   receiving a modified control rule for the service from the control server, wherein the modified control rule includes a removal indicator indicating a particular parameter to be removed for the first control rule previously installed;
   removing the particular parameter indicated by the removal indicator for the first control rule previously installed;
   if any additional parameter is included in the modified control rule, enabling the additional parameter for the first control rule previously installed; and
   enforcing the first control rule with the enabled parameters.

8. The method of claim 7, further comprising:
   receiving from the control server, prior to receiving the modified control rule for the service, a further control rule for a further service or application, both hereinafter indistinctly referred to as the further service, wherein the further control rule comprises the particular parameter amongst a plurality of further parameters to be used for enforcement of the further control rule for the further service; and
   installing the further control rule and enforcing the further control rule by enabling the plurality of further parameters.

9. The method of claim 8, further comprising, upon receiving the modified control rule with the removal indicator indicating the particular parameter to be removed for the first control rule previously installed, maintaining the plurality of further parameters previously enabled, without removing the particular parameter, for the further control rule.

10. The method of claim 8, wherein the first control rule and the further control rule include a common monitoring key associated with the service and with the further service, wherein receiving the first control rule and the further control rule from the control server include receiving a usage threshold, hereinafter referred to as monitoring quota, associated with the common monitoring key, and further comprises monitoring user traffic for the service and the further service using the monitoring quota.

11. The method of claim 10, wherein the removal indicator in the modified control rule indicates the common monitoring key, wherein the common monitoring key is removed for the first control rule and maintained for the further control rule previously installed, and wherein the user traffic is monitored for the further service and not monitored for the service.

12. The method of claim 7, wherein the removal indicator in the modified control rule indicates a policy-related, charging-related, QoS-related or sponsor-related parameter, which is included at least in the first control rule, and wherein the corresponding policy-related, charging-related, QoS-related or sponsor-related parameter is removed only for the first control rule previously submitted.

13. A control server for providing control rules for services and applications in a Policy and Charging Control, PCC, architecture, the control server comprising:
one or more processors configured to determine a first control rule for a service or application, both hereinafter indistinctly referred to as the service, wherein the first control rule comprises a plurality of parameters to be used for enforcement of the first control rule for the service;
a transmitter configured to submit the first control rule to an enforcing device;
wherein the one or more processors, upon determining that a particular parameter, amongst the plurality of parameters, is no longer applicable for the first control rule, is configured to determine a modified control rule that includes a removal indicator indicating the particular parameter to be removed for the first control rule previously submitted; and
wherein the transmitter is configured to submit the modified control rule to the enforcing device.

14. The control server of claim 13, wherein:
the one or more processors are is configured to, prior to determining that the particular parameter is no longer applicable for the first control rule, determine a further control rule for a further service or application, both hereinafter indistinctly referred to as the further service, the further control rule comprising the particular parameter amongst a plurality of further parameters to be used for enforcement of the further control rule for the further service; and
the transmitter is configured to submit the further control rule to the enforcing device.

15. The control server of claim 14, wherein the one or more processors are configured to, upon determining that the particular parameter is no longer applicable for the first control rule, determine that the particular parameter is still applicable for the further control rule so that a modified further control rule with the removal indicator is not required.

16. The control server of claim 14, further comprising one or more processors configured to:
identify a common monitoring key associated with the service and with the further service;
determine a usage threshold, hereinafter referred to as monitoring quota, associated with the common monitoring key;
include the common monitoring key in the first control rule and the further control rule; and
submit the monitoring quota associated with the common monitoring key, along with the first control rule and the further control rule, to the enforcing device.

17. The control server of claim 16, wherein the particular parameter no longer applicable for the first control rule is the common monitoring key included in the first control rule and the further control rule, and wherein the removal indicator included in the modified control rule indicates the common monitoring key, which is to be removed at the enforcing device only for the first control rule and not for the further control rule previously submitted.

18. The control server of claim 13, wherein the particular parameter no longer applicable for the first control rule is a policy-related, charging-related, QoS-related or sponsor-related parameter included, at least, in the first control rule, and wherein the removal indicator included in the modified control rule indicates the corresponding policy-related, charging-related, QoS-related or sponsor-related parameter, which is to be removed at the enforcing device only for the first control rule previously submitted.

19. An enforcing device for enforcement of control rules for services and applications in a Policy and Charging Control, PCC, architecture, the enforcing device comprising:
a receiver configured to receive, from a control server, a first control rule for a service or application, both hereinafter indistinctly referred to as the service, wherein the first control rule comprises a plurality of parameters to be used for enforcement of the first control rule for the service;
one or more processors configured to install the first control rule and enforce the first control rule by enabling the plurality of parameters;
the receiver being configured to receive, from the control server, a modified control rule for the service, wherein the modified control rule includes a removal indicator indicating a particular parameter to be removed for the first control rule previously installed;
the one or more processors being configured to remove the particular parameter indicated by the removal indicator for the first control rule previously installed;
if any additional parameter is included in the modified control rule, the one or more processors being configured to enable the additional parameter for the first control rule previously installed; and
the one or more processors being configured to enforce the first control rule with the enabled parameters.

20. The enforcing device of claim 19, wherein:
the receiver is configured to receive from the control server, prior to receiving the modified control rule for the service, a further control rule for a further service or application, both hereinafter indistinctly referred to as the further service, wherein the further control rule comprises the particular parameter amongst a plurality of further parameters to be used for enforcement of the further control rule for the further service; and
the one or more processors are configured to install the further control rule and enforce the further control rule by enabling the plurality of further parameters.

21. The enforcing device of claim 20, wherein the one or more processors, upon receiving by the receiver the modified control rule with the removal indicator indicating the particular parameter to be removed for the first control rule previously installed, are configured to maintain the plurality of further parameters previously enabled, without removing the particular parameter, for the further control rule.

22. The enforcing device of claim 20, wherein the first control rule and the further control rule include a common monitoring key associated with the service and with the further service, wherein the receiver receiving the first control rule and the further control rule from the control server is configured to receive a usage threshold, hereinafter referred to as monitoring quota, associated with the common monitoring key, and the one or more processors are further configured to monitor user traffic for the service and the further service using the monitoring quota.

23. The enforcing device of claim 22, wherein the removal indicator in the modified control rule indicates the common monitoring key, wherein the one or more processors are configured to remove the common monitoring key for the first control rule and maintain the common monitoring key for the further control rule previously installed, and wherein the one or more processors are configured to monitor the user traffic for the further service and not for the service.

24. The enforcing device of claim 19, wherein the removal indicator in the modified control rule indicates a policy-related, charging-related, QoS-related or sponsor-related parameter, which is included at least in the first control rule, and wherein the one or more processors are configured to remove the corresponding policy-related, charging-related, QoS-related or sponsor-related parameter only for the first control rule previously submitted.

25. A non-transitory computer-readable medium storing instructions which, when executed on at least one processor, cause the at least one processor to carry out the method according to claim 1.

26. A non-transitory computer-readable medium storing instructions which, when executed on at least one processor, cause the at least one processor to carry out the method according to claim 7.

* * * * *